United States Patent
Tiemeyer

(10) Patent No.: US 12,090,810 B2
(45) Date of Patent: Sep. 17, 2024

(54) THERMAL MANAGEMENT SYSTEM FOR AN ELECTRIC VEHICLE AND METHOD FOR OPERATING SAID THERMAL MANAGEMENT SYSTEM

(71) Applicant: HELLA GmbH & Co. KGaA, Lippstadt (DE)

(72) Inventor: Sebastian Tiemeyer, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/082,208

(22) Filed: Dec. 15, 2022

(65) Prior Publication Data

US 2023/0123676 A1     Apr. 20, 2023

Related U.S. Application Data

(63) Continuation of application No. PCT/EP2020/082196, filed on Nov. 16, 2020.

(30) Foreign Application Priority Data

Jun. 24, 2020   (DE) .................. 10 2020 116 597.8
Sep. 24, 2020   (DE) .................. 10 2020 124 915.2

(51) Int. Cl.
*B60H 1/00*       (2006.01)
*B60H 1/14*       (2006.01)
(Continued)

(52) U.S. Cl.
CPC ..... *B60H 1/00278* (2013.01); *B60H 1/00885* (2013.01); *B60H 1/143* (2013.01);
(Continued)

(58) Field of Classification Search
CPC ............ B60H 1/00278; B60H 1/00885; B60H 1/32281; B60H 1/143; B60L 58/24
See application file for complete search history.

(56) References Cited

U.S. PATENT DOCUMENTS 10,899,191 B2 *  1/2021  Lee ................... B60H 1/00278
11,207,941 B2 * 12/2021  Lee ................... B60H 1/00885
(Continued)

FOREIGN PATENT DOCUMENTS

DE       112017000275 T5    9/2018
WO       WO2019066330 A1    4/2019

OTHER PUBLICATIONS

International Search Report dated Mar. 12, 2021 in corresponding application PCT/EP2020/082196.

*Primary Examiner* — Kevin R Barss
(74) *Attorney, Agent, or Firm* — Muncy, Geissler, Olds & Lowe, P.C.

(57) ABSTRACT

A thermal management system for an electric vehicle, having a control unit, a battery circuit connected to a drive battery of the electric vehicle, a drive circuit connected to an electric drive of the electric vehicle or to a power electronics for an electric drive, and an air conditioning circuit connected for heat transfer to a vehicle interior of the electric vehicle. The battery circuit and the drive circuit are each operable with a coolant and can be connectable from one another for transfer of coolant by an actuatable coolant valve. The air conditioning circuit can be operated with a refrigerant different from the coolant. A heat transfer connection between the battery circuit and/or the drive circuit on the one hand and the air conditioning circuit on the other hand can be established or separated by at least one heat exchange device of the thermal management system.

12 Claims, 5 Drawing Sheets

(51) Int. Cl.
*B60H 1/32* (2006.01)
*B60L 58/24* (2019.01)

(52) U.S. Cl.
CPC .......... *B60H 1/32281* (2019.05); *B60L 58/24* (2019.02); *B60H 2001/00307* (2013.01)

(56) References Cited

U.S. PATENT DOCUMENTS

| | | |
|---|---|---|
| 11,214,116 B2 | 1/2022 | Kim et al. |
| 11,485,252 B2 * | 11/2022 | Lee ................. H01M 10/625 |
| 2016/0107505 A1 | 4/2016 | Johnston |
| 2016/0107506 A1 * | 4/2016 | Johnston ............ B60H 1/00278 |
| | | 165/202 |
| 2016/0297280 A1 * | 10/2016 | Riederer ............... F25B 21/04 |
| 2016/0318370 A1 * | 11/2016 | Rawlinson ......... B60H 1/32281 |
| 2017/0309976 A1 * | 10/2017 | Lambert ............ B60H 1/00278 |
| 2018/0178615 A1 * | 6/2018 | Xia .................... H01M 10/486 |
| 2018/0236842 A1 * | 8/2018 | Allgaeuer .......... B60H 1/00278 |
| 2018/0272877 A1 * | 9/2018 | Sakowski ........... H01M 10/615 |
| 2018/0304739 A1 * | 10/2018 | Eberspach ......... B60H 1/00278 |
| 2018/0370324 A1 * | 12/2018 | Zhou ................. B60H 1/00278 |
| 2019/0047363 A1 * | 2/2019 | Sonnekalb ......... B60H 1/00371 |
| 2019/0047365 A1 * | 2/2019 | Sonnekalb ......... B60H 1/32284 |
| 2019/0070924 A1 | 3/2019 | Mancini et al. |
| 2019/0135075 A1 | 5/2019 | Hwang et al. |

\* cited by examiner

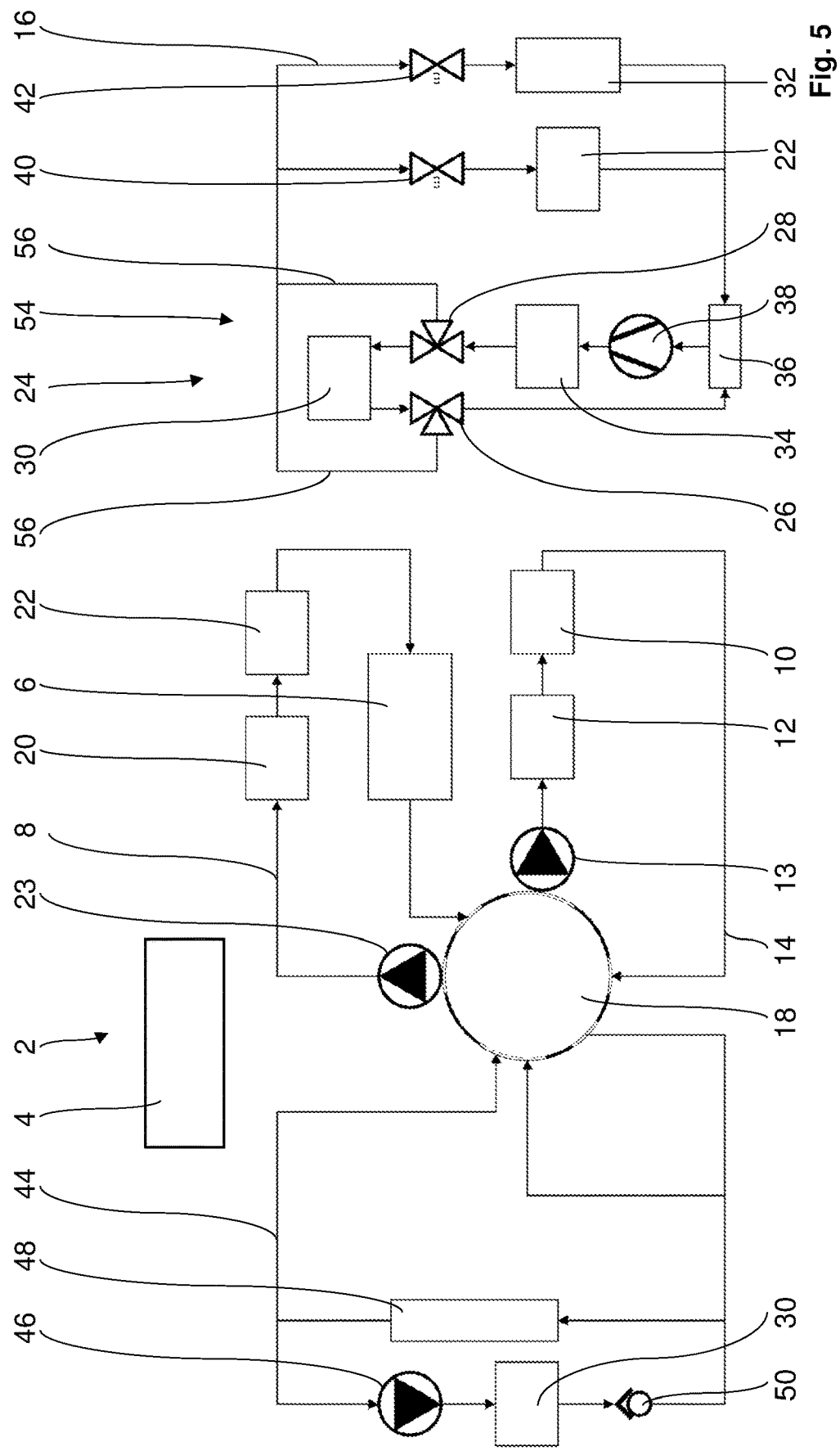

THERMAL MANAGEMENT SYSTEM FOR AN ELECTRIC VEHICLE AND METHOD FOR OPERATING SAID THERMAL MANAGEMENT SYSTEM

This nonprovisional application is a continuation of International Application No. PCT/EP2020/082196, which was filed on Nov. 16, 2020 and which claims priority to German Patent Application No. 10 2020 116 597.8, which was filed in Germany on Jun. 24, 2020, and to German Patent Application No. 10 2020 124 915.2, which was filed in Germany on Sep. 24, 2020, and which are both herein incorporated by reference.

BACKGROUND OF THE INVENTION

Field of the Invention

The present invention relates to a thermal management system for an electric vehicle and a method for operating the thermal management system.

Description of the Background Art

Thermal management systems for electric vehicles and methods for their operation are known from the prior art in numerous embodiments and comprise a control unit, a battery circuit connected for heat transfer to a drive battery of the electric vehicle, a drive circuit connected for heat transfer to an electric drive of the electric vehicle and/or to power electronics for an electric drive, and an air conditioning circuit drive circuit connected for heat transfer to a vehicle interior of the electric vehicle, wherein on the one hand, the battery circuit and the drive circuit are each operable with a coolant and are connected to or separated from each other by means of at least one actuatable coolant valve for transfer of coolant and on the other hand, the air conditioning circuit is operated with a refrigerant different from the coolant.

This is where the present invention comes in.

SUMMARY OF THE INVENTION

It is therefore an object of the present invention to provide a thermal management system for an electric vehicle and a method for operating said thermal management system.

This object is achieved by a thermal management system for an electric vehicle, which is characterized in that a heat transfer connection between the battery circuit and/or the drive circuit on the one hand, and the air conditioning circuit on the other hand can be established or separated by means of at least one heat exchange device of the thermal management system depending on an actuation of the coolant valve and an actuation of the heat exchange device by means of the control unit. The aforementioned heat transfer connection can thus be established or separated between the air conditioning circuit with the refrigerant on the one hand and at least one of the aforementioned coolant circuits, namely the battery circuit and/or the drive circuit. Further, this object is achieved by a method for operating a thermal management system for an electric vehicle. In particular, the electric vehicle may be a motor vehicle used for road traffic. Furthermore, the electric vehicle is freely selectable within wide suitable limits and may, for example, be designed as a vehicle only having an electric drive or as a vehicle having a so-called hybrid drive, i.e., an electric drive and a combustion engine. The subclaims relate to advantageous further developments of the invention.

A significant advantage of the invention is in particular that a thermal management system for an electric vehicle and a method for its operation are improved. Due to the inventive formation of the thermal management system for an electric vehicle and the method for its operation, an efficient temperature control of the electric vehicle, namely of the drive battery of the electric drive and/or the power electronics for the electric drive and/or the vehicle interior of the electric vehicle, with a simultaneously simplified structure of the thermal management system, is made possible. Accordingly, for example, an air-refrigerant condenser in the front end of the electric vehicle is dispensable. Furthermore, the thermal management system according to the invention can be realized with a lower design and manufacturing effort and at lower costs. The system architecture according to the invention as a whole is significantly simplified as compared to conventional technical solutions.

In principle, the thermal management system can be freely selected according to type, function, material, dimensioning and number of components as well as their arrangement to each other and to the rest of the electric vehicle within wide suitable limits.

The heat exchange device can comprise at least one refrigerant valve and at least one heat exchanger, wherein the heat exchanger can be flowed through by refrigerant or not depending on an actuation of the refrigerant valve by means of the control unit. In this way, the establishment or separation of the heat transfer connection between the air conditioning circuit on the one hand and at least one of the coolant circuits on the other hand, i.e., the battery circuit and/or the drive circuit, are easily controllable. In addition, by means of the at least one refrigerant valve, a heat transfer connection between the aforementioned heat exchanger and a residual of the air conditioning circuit and also between this heat exchanger and the vehicle interior to be tempered are easily controllable.

The terms control unit and controllable can be interpreted broadly according to the invention and also include control systems or combinations of a control unit and a control system.

The thermal management system additionally can comprise a coolant-operated heat transfer circuit, wherein at least one of the at least one heat exchangers is arranged in the heat transfer circuit such that by means of this heat exchanger, a heat transfer connection between the coolant flowing in the heat transfer circuit and the refrigerant can be established or separated, and wherein the heat transfer circuit can be connected to or separated from the battery circuit and/or the drive circuit for transfer of coolant, preferably in that the coolant valve is simultaneously formed as the further coolant valve, by means of at least one further coolant valve which is actuatable by means of the control unit. This enables an additional degree of freedom in the establishment or separation of the heat transfer connection between the air conditioning circuit on the one hand and at least one of the coolant circuits.

Accordingly, an advantageous development of the method according to the invention provides that by means of an actuation of the further coolant valve by means of the control unit, the heat transfer circuit is connected to or separated from the battery circuit and/or the drive circuit for transfer of coolant.

Thus, even more complex thermal management systems can be implemented in a simple way in terms of design, manufacturing technology and circuitry. On the other hand, the use of the aforementioned heat transfer circuit allows for the establishment or separation of an additional heat transfer connection of the heat exchanger arranged in the heat transfer circuit, for example to a free environment and/or to a further coolant circuit of the electric vehicle and/or to a further refrigerant circuit of the electric vehicle.

Accordingly, an advantageous development of the aforementioned embodiment of the thermal management system according to the invention provides that the heat transfer circuit can be formed such that by means of the heat transfer circuit, a heat transfer connection between the coolant flowing in the heat transfer circuit and a free environment can be established or separated, preferably that this heat transfer to the free environment is enabled by means of the at least one heat exchanger arranged in the heat transfer circuit. By means of the preferred embodiment of this further development, this is technically feasible, for example, even without an additional heat exchanger. However, embodiments of this further development in which, alternatively or in addition to this heat exchanger, an additional heat exchanger is used in the heat transfer circuit are also conceivable.

A further advantageous development of the thermal management system according to the invention provides that the heat exchange device and/or the coolant valve and/or the further coolant valve are designed in such a coordinated manner that the battery circuit and/or the drive circuit on the one hand are heatable and/or coolable by means of the heat exchange device, and the air conditioning circuit and/or the heat transfer circuit on the other hand, and/or that the air conditioning circuit on the one hand is heatable and/or coolable by means of the heat exchange device, and the battery circuit and/or the drive circuit and/or the heat transfer circuit on the other hand. This enables a versatile application of the thermal management system according to the invention for temperature control of the electric vehicle, so that a variety of applications can be covered.

Another advantageous development of the thermal management system according to the invention provides that in the battery circuit and/or the drive circuit and/or the air conditioning circuit and/or the heat transfer circuit, the thermal management system can comprise at least one bypass device having at least one bypass line and at least one actuatable bypass valve, wherein by means of the respective bypass device a heat exchanger arranged in the respective circuit can be flowed through or not depending on an actuation of the bypass valve by means of the control unit. In this way, the functional complexity of the thermal management system according to the invention as well as the needs-based temperature control of the individual circuit is further improved.

Accordingly, a further advantageous development of the method according to the invention provides that, depending on an actuation of the bypass valve, a heat exchanger arranged in the respective circuit having a bypass device is flowed through or not.

Further, a particularly advantageous development of the method according to the invention provides that the actuation of the coolant valve and/or the heat exchange device and/or the further coolant valve and/or the bypass valve and/or a pump actuatable by means of the control unit takes place in one of said coolant circuits for conveying the coolant in this coolant circuit depending on the vehicle state of the electric vehicle and/or the driving state of the electric vehicle and/or at least one ambient condition of the free environment. As a result, the temperature control of the electric vehicle can be adapted very easily to the prevailing conditions when using the electric vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows an example of the thermal management system according to the invention for an electric vehicle, in a block diagram.

DETAILED DESCRIPTION

Figure 1:
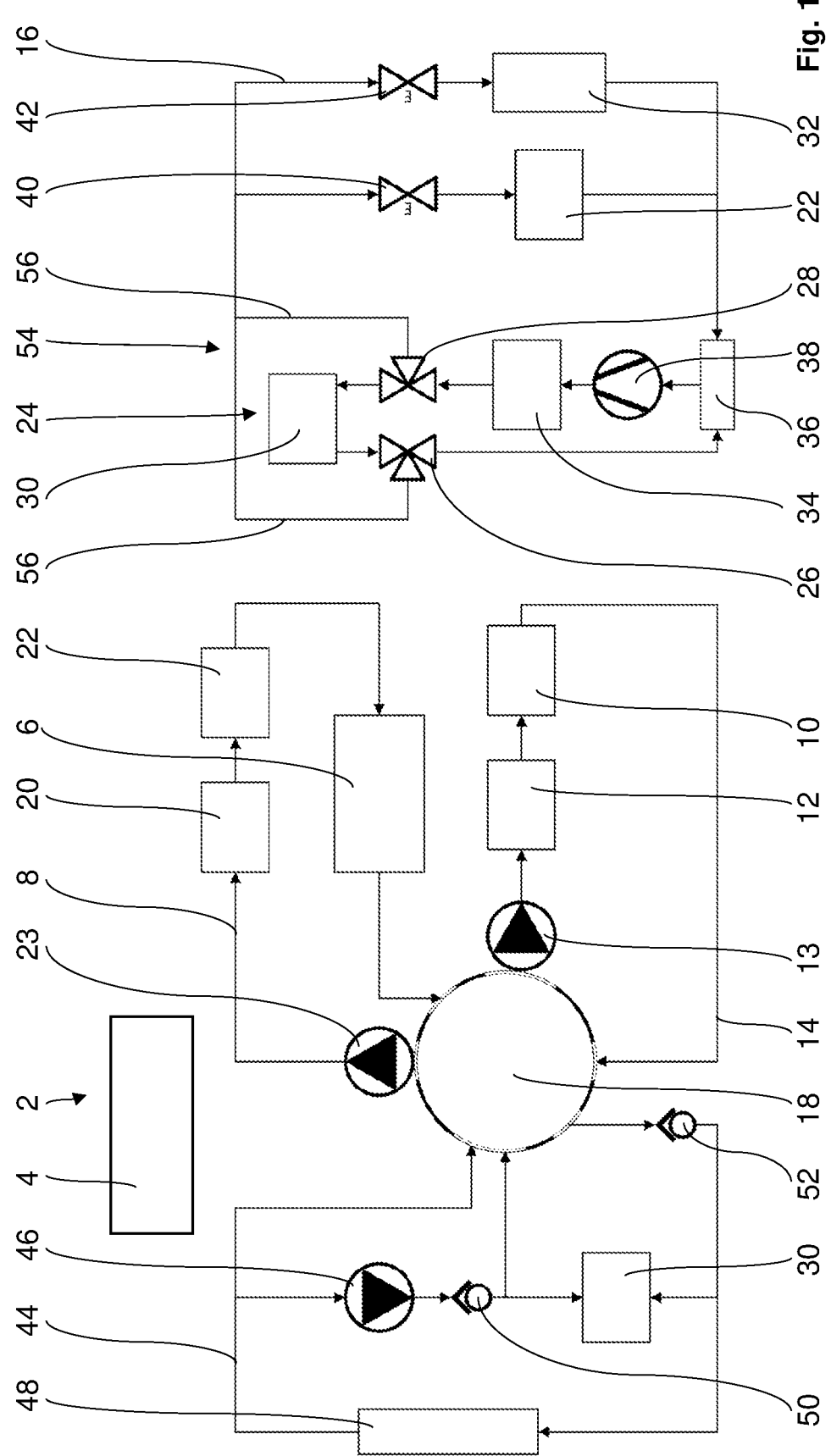
FIG. 1 shows an example of the thermal management system according to the invention for an electric vehicle, in a block diagram.
Figure 2:
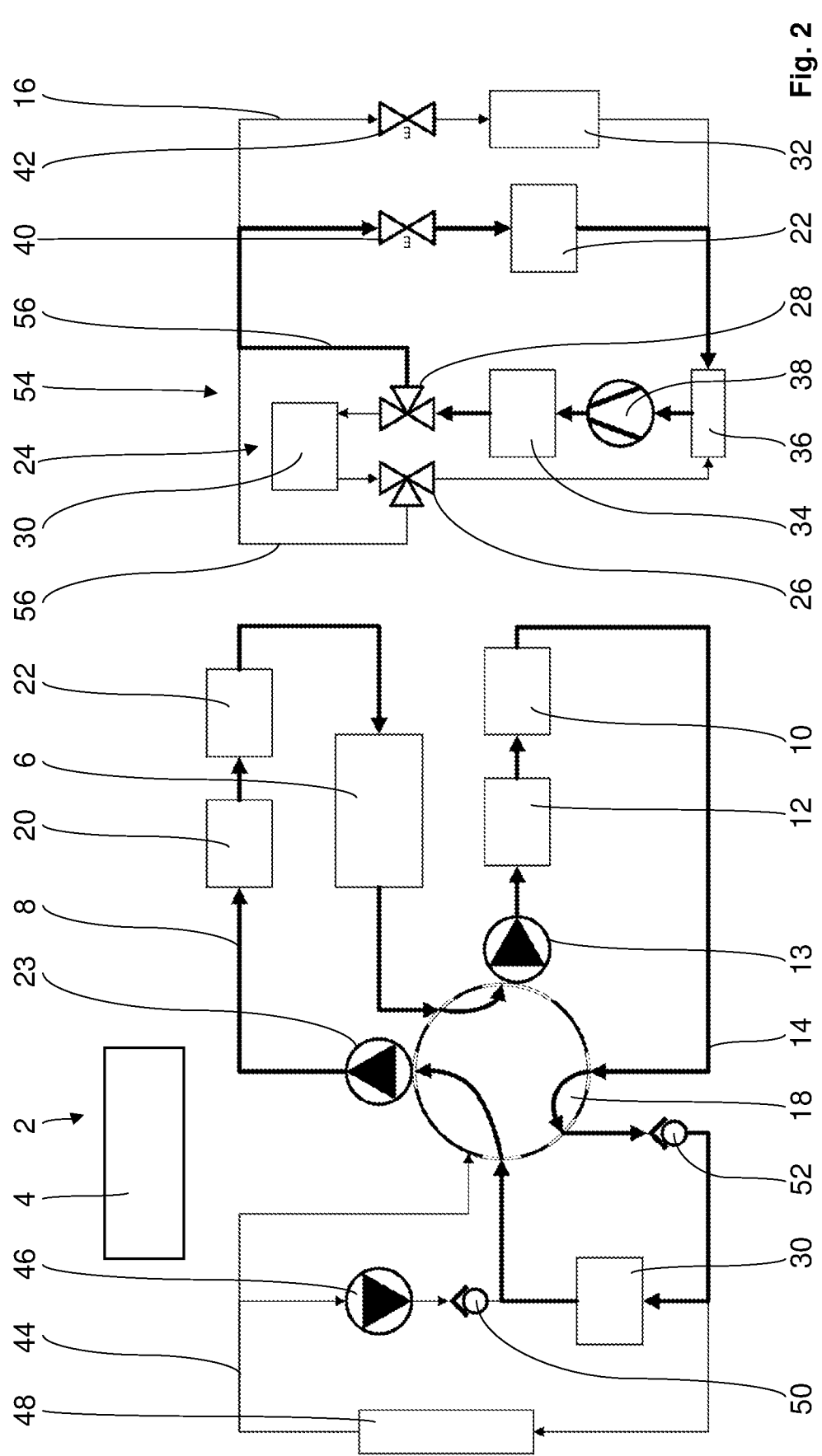
FIG. 2 shows the example in a first mode of operation.
Figure 3:
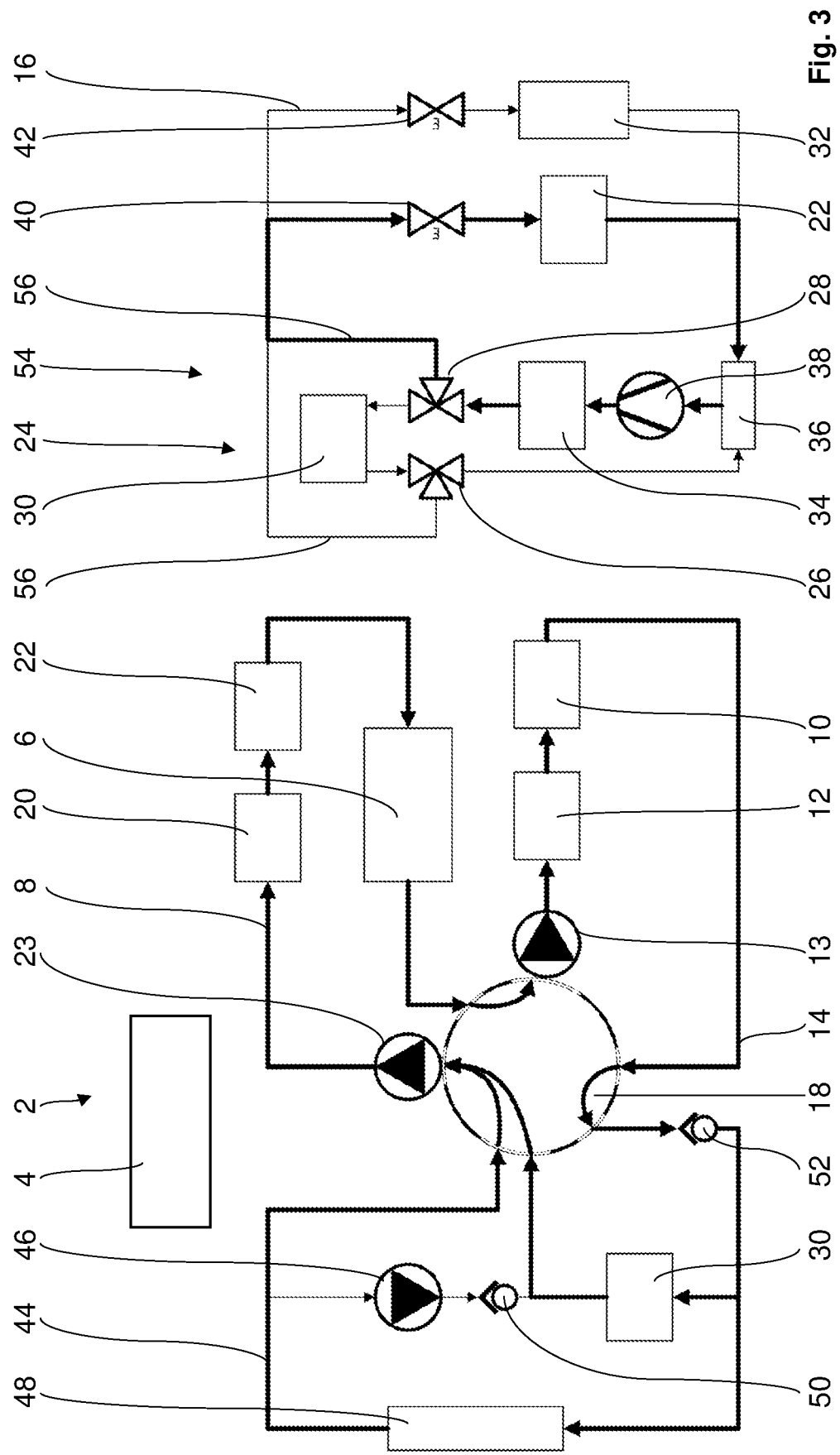
FIG. 3 shows the example in a second mode of operation.

FIGS. 1 to 3 show an example of the thermal management system according to the invention for an electric vehicle for carrying out the method according to the invention purely by way of example.

The electric vehicle, not shown, is designed in the present embodiment as a purely electric vehicle.

The thermal management system 2 for the electric vehicle comprises a control unit 4, a battery circuit 8 connected for heat transfer to a drive battery 6 of the electric vehicle, a drive circuit 14 connected for heat transfer to an electric drive 10 of the electric vehicle and power electronics 12 for the electric drive 10, and an air conditioning circuit 16 connected for heat transfer to an unspecified vehicle interior of the electric vehicle, wherein one the one hand, the battery circuit 8 and the drive circuit 14 are each operable with an unspecified coolant and can be connected or separated by means of at least one actuatable coolant valve 18 for transfer of coolant and on the other hand, the air conditioning circuit 16 is operated with a refrigerant different from the coolant. The coolant valve 18 is designed in the present embodiment as a single multi-way valve. However, other embodiments of the at least one coolant valve are conceivable. For example, the at least one coolant valve may be formed as a plurality of valves connected to each other in a manner known in the art.

In the battery circuit 8, in addition to the drive battery 6, a PTC heater 20, a cooler 22, i.e., a so-called chiller, and a coolant pump 23 are arranged. The drive battery 6 serves in a manner known in the art to supply the electric drive 10 with electric current. The electric drive 10 is designed in a manner known in the art for moving the electric vehicle. In addition to the electric drive 10 and the corresponding power electronics 12, analogous to the battery circuit 8, the drive circuit 14 comprises a coolant pump 13.

Between the battery circuit 8 and/or the drive circuit 14 on the one hand, and the air conditioning circuit 16 on the other hand, a heat transfer connection can be established or separated by means of at least one heat exchange device 24 of the thermal management system 2 depending on an actuation of the coolant valve 18 and an actuation of the heat exchange device 24 by means of the control unit 4. This is explained in more detail below. The heat exchange device 24 comprises two refrigerant valves 26, 28 and a heat exchanger 30, wherein depending on an actuation of the refrigerant valves 26, 28 by means of the control unit 4, the heat exchanger 30 can be flowed through by refrigerant or not. The refrigerant valves 26, 28 are each designed here as a 3/2-way valve. Alternatively, the two 3/2-way valves 26, 28 can be replaced by a single 6/2-way valve. Of course, other variants are also conceivable. See, for example, the second embodiment according to FIG. 4.

As can also be seen from FIG. 1, in addition to the heat exchange device 24, the chiller 22, an evaporator 32, a condenser 34, an accumulator 36, a compressor 38 and two valves 40, 42 are also arranged in the air conditioning circuit 16. The chiller 22 is arranged accordingly both in the battery circuit 8 and in the air conditioning circuit 16. Analogously to the heat exchange device 24, a heat transfer connection between the air conditioning circuit 16 on the one hand, and the battery circuit 8 on the other hand, can be established or separated by means of the chiller 22 depending on an actuation of the coolant valve 18 and an actuation of the valve 40 by means of the control unit 4. The chiller 22 can be flowed through by refrigerant or not, depending on an actuation of the valve 40 by means of the control unit 4. See FIG. 1. The remaining function of the air conditioning circuit 16 otherwise corresponds to that of conventional refrigerant circuits.

In the present embodiment, the thermal management system 2 additionally comprises a coolant-operated heat transfer circuit 44, wherein the heat exchanger 30 is arranged in the heat transfer circuit 44 such that by means of this heat exchanger 30, a heat transfer connection between the coolant flowing in the heat transfer circuit 44 and the refrigerant can be established or separated. The heat exchanger 30 is arranged accordingly both in the heat transfer circuit 44 and in the air conditioning circuit 16. The heat transfer circuit 44 is connectable or separable for transfer of coolant by means of at least one further coolant valve, which is actuatable by means of the control unit 4, to the battery circuit 8 and/or the drive circuit 14, wherein the coolant valve 18 is simultaneously formed here as the further coolant valve. Furthermore, in addition to the heat exchanger 30 of the heat exchange device 24, analogous to the battery circuit 8 and the drive circuit 14, a coolant pump 46, a heat exchanger 48 formed as a radiator and two check valves 50, 52 are also arranged in the heat transfer circuit 44. The heat transfer circuit 44 is configured by means of the heat exchanger 48 formed as a radiator such that a heat transfer connection between the coolant flowing in the heat transfer circuit 44 and a free environment can be established or separated.

The heat exchange device 24 and the coolant valve 18 are designed coordinated in such a way that the battery circuit 8 and/or the drive circuit 14 on the one hand are heatable and/or coolable by means of the heat exchange device 24, the air conditioning circuit 16 and the heat transfer circuit 44 on the other hand, and vice versa, namely that the air conditioning circuit 16 on the one hand is heatable and/or coolable by means of the heat exchange device 24, and the battery circuit 8 and/or the drive circuit 14 and the heat transfer circuit 44 on the other hand.

In order to meet the functional complexity of the thermal management system according to the present embodiment, the thermal management system 2 comprises, in the air conditioning circuit 16, a bypass device 54 having a bypass line 56 and two actuatable bypass valves, wherein the refrigerant valves 26, 28 are formed here as the bypass valves. By means of the bypass device 54, the heat exchanger 30 arranged in the air conditioning circuit 16 can be flowed through or not in the desired manner depending on an actuation of the coolant valves 26, 28 by means of the control unit 4.

The aforementioned coolant valve 18 and/or the aforementioned refrigerant valves 26, 28 and/or valves 40, 42 may be formed and actuatable by means of the control unit 4 such that the respective valve 18, 26, 28, 40, 42 does not merely block or release a coolant line of one of the coolant circuits 8, 14, 44 or a refrigerant line of the refrigerant circuit 16, but rather, it may also be provided that at least one of the aforementioned valves 18, 26, 28, 40, 42 partially blocks or opens the corresponding coolant line or refrigerant line, so that the coolant or refrigerant flowing in this coolant line or refrigerant line flows with a reduced volume flow, i.e., is throttled. Accordingly, mixtures of the coolant at different temperature levels are adjustable by means of the aforementioned valves 18, 26, 28, 40, 42. The same applies to the refrigerant.

In the following, the functionality of the thermal management system according to the invention and the inventive method for its operation are explained in more detail according to the present embodiment and on the basis of FIGS. 1 to 3.

By means of the thermal management system 2 of the electric vehicle, it is possible to cool the battery circuit 8 by means of the chiller 22 and to heat it by means of the PTC heater 20. The waste heat of the drive battery 6 can be used to heat the vehicle interior, wherein this waste heat and/or the heat generated by the PTC heater 20 can be transferred via the chiller 22 to the air conditioning circuit 16. Waste heat from the drive circuit 14, namely the power electronics 12 and the electric drive 10, can be delivered to the coolant for the purpose of subsequent release of this waste heat to the heat transfer circuit 44 and/or to the battery circuit 8 for direct heating of the drive battery 6 and/or for heating the vehicle interior by means of the chiller 22. The air conditioning circuit 16 can be used by means of the evaporator 32 for cooling and by means of the condenser 34 for heating the vehicle interior. The heat transfer circuit 44 is used in the present embodiment for cooling and heating the battery circuit 8 and/or the drive circuit 14 and/or, by means of the air conditioning circuit 16, the interior. The cooling is carried out, for example, by means of the heat exchanger 48 designed as a radiator, i.e., by heat emission to the free environment and/or by means of the heat exchanger 30. The heating is carried out, for example, by means of the heat exchanger 48 designed as a radiator, i.e., by heat absorption from the free environment and/or by means of the heat exchanger 30.

Depending on the state of the respective coolant circuit 8, 14 or the refrigerant circuit 16 and taking into account the vehicle state and/or the driving state and/or the ambient conditions, for example the ambient temperature, the various circuits 8, 14, 16, 44 can represent heat sources or heat sinks.

The efficiency of the thermal management system 2 as a whole can be improved according to the invention by a demand-oriented thermal connection or separation of the individual circuits 8, 14, 16, 44. For example, while the electric vehicle is driving, the drive battery 6 can be efficiently heated in the cold state by the waste heat of the electric drive 10. For this purpose, the battery circuit 8 must be connected for transfer of coolant to the drive circuit 14 by means of the coolant valve 18. At very high ambient temperatures, however, a separation of battery circuit 8 and drive circuit 14 is absolutely necessary so that only the heat-sensitive drive battery 6 can be cooled by the chiller 22.

By means of the refrigerant valve 28 in a first switching position, namely to the effect that the refrigerant valve 28 is completely open to the heat exchanger 30 and the bypass line 56 is open, the heat exchanger 30 acts as a heat source for the heat transfer circuit 44. Heat is thus transferred from the air conditioning circuit 16 to the heat transfer circuit 44 and from there either by means of the heat exchanger 48 designed as a radiator to the free environment or by means of the refrigerant valve 18 and the battery circuit 8, for example, to the drive battery 6. As a result, for example, a large condenser in the front end of the electric vehicle can be dispensed with, since the transfer of waste heat from the air conditioning circuit 16 is ensured by the heat exchanger 30. As a result, the selectively connectable heat transfer circuit 44, in addition to the realization of various operating modes of the thermal management system 2, allows for a simplification of the air conditioning circuit 16.

In a second switching position of the refrigerant valve 28, in which the flow of the refrigerant through the refrigerant valve 28 is throttled, a low-pressure range for the heat exchanger 30 is created by the taper in the refrigerant valve 28, so that it now works analogously to the chiller 22. The heat exchanger 30 thus transfers heat from the heat transfer circuit 44 to the air conditioning circuit 16. This is used, for example, to extract heat from the free environment, i.e., the ambient air, in order to control the temperature of the vehicle interior. For this purpose, the heat exchanger 30 transfers heat from the heat transfer circuit 44 to the air conditioning circuit 16 until the temperature in the heat transfer circuit 44 falls below the ambient temperature, i.e., the temperature of the free environment. As a result, the now colder coolant in the heat transfer circuit 44 is heated by the ambient air to the ambient temperature when passing through the heat exchanger 48 formed as a radiator. Subsequently, the heat exchanger 30 can again extract heat from the coolant in the heat transfer circuit 44, which is transferred to the vehicle interior via the condenser 34 in the air conditioning circuit 16. In addition, in this operating mode of the thermal management system 2, the battery circuit 8 and the drive circuit 14 are connected for transfer of coolant, so that the waste heat of the drive battery 6, of the electric drive 10 and of the power electronics 12 can also be transferred to the vehicle interior via the chiller 22.

Taking into account all conceivable vehicle states, driving states and ambient conditions there is a large number of conceivable connections and separations, i.e., operating modes of the thermal management system 2, between the battery circuit 8, the drive circuit 14 and the air conditioning circuit 16. Due to the inventive design of the thermal management system 2, in contrast to conventional thermal management systems for electric vehicles, the constructive, manufacturing and circuit complexity of the thermal management system according to the invention, for example, the number of required coolant lines and refrigerant lines as well as the number of coolant valves and refrigerant valves required are not increased at all or to a lesser extent as compared to less functional thermal management systems.

The air conditioning circuit 16 can extract heat from the battery circuit 8 by means of the chiller 22 for heating the vehicle interior. At very low outside temperatures, for example at ambient temperatures of less than −10° C., the PTC heater 20 is the only heat source when starting the electric vehicle. However, the efficiency of the heat transfer from the PTC heater 20 via the chiller 22 to the air conditioning circuit 16 is limited by the very low coolant temperature. For this reason, the coolant pump 23 in the battery circuit 8 is operated in a particularly slow delivery mode under these environmental conditions. As a result, only a small amount of coolant flows per time through the PTC heater 20, so that this coolant can be heated to an advantageously high temperature in order to be able to efficiently extract heat from this coolant by means of the chiller 22 for temperature control of the vehicle interior.

By way of example, the use of the thermal management system 2 is shown below using the operating modes of the thermal management system 2 according to FIGS. 2 and 3, wherein the coolant lines of the coolant circuits 8, 14, 44 flowed through by coolant or the refrigerant lines of the air conditioning circuit 16 formed as a refrigerant circuit flowed through by refrigerant are highlighted in FIGS. 2 and 3 with thick lines.

For example, it is possible to use both the heat exchanger 30 and the chiller 22 for transferring the waste heat of the drive circuit 14, namely the waste heat of the electric drive 10 and the power electronics 12, and the waste heat of the battery circuit 8, namely the waste heat of the drive battery 6.

In the operating mode according to FIG. 2, only the chiller 22 is used for transferring the waste heat of the drive circuit 14, namely the waste heat of the electric drive 10 and the power electronics 12, and the waste heat of the battery circuit 8, namely the waste heat of the drive battery 6.

In addition, by proportionally mixing the individual coolant flows between the heat exchanger 48 designed as a radiator and its bypass, part of the waste heat of the drive circuit 14 can be released into the free environment. This may be advantageous to ensure a constant heating power when heating the vehicle interior by means of the air conditioning circuit 16 in dynamic driving of the electric vehicle, for example when there is a temporary, too great waste heat output of the battery circuit 8 and / or the drive circuit 14. See FIG. 3.

In addition to the aforementioned operating modes, further operating modes can be realized by means of the thermal management system 2 according to FIGS. 1 to 3.

Purely by way of example, the following other operating modes are mentioned here:

For example, an operating mode of the thermal management system 2 may provide to simultaneously use ambient heat from the free environment via the heat exchanger 30 and waste heat from the drive battery 6, the electric drive 10 and the power electronics 12 via the chiller 22 to heat the vehicle interior of the electric vehicle.

In another example of a possible operating mode, the heat exchanger 30 is used to transfer the waste heat from the drive circuit 14 by means of the heat exchanger 48 to the free environment and by means of the heat exchanger 30 to the air conditioning circuit 16, while by means of the chiller 22, the waste heat of the drive battery 6 is transferred to the air conditioning circuit 16. As a result, the optimum temperature can be set in each case for the battery circuit 8 and the drive circuit 14, namely, for example, a higher temperature level for the drive circuit 14 as compared to the battery circuit 8, than would be possible if the chiller 22 were shared by both.

Furthermore, in a further operating mode of the thermal management system 2, both the waste heat output of the PTC heater 20 in the battery circuit 8 and the heat loss of the compressor 38 in the air conditioning circuit 16 can be used to heat the vehicle interior of the electric vehicle. For this purpose, the heat transfer circuit 44 and the battery circuit 8 are connected to each other for transfer of coolant by means of the coolant valve 18. The PTC heater 20 heats the coolant of the battery circuit 8, wherein heat is extracted immediately afterwards from this coolant by the chiller 22. This heat is only partially given off via the condenser 34 to the vehicle interior of the electric vehicle. The remaining part of the heat is again supplied by the heat exchanger 30 to at least one of the coolant circuits 8, 14, 44. As a result, the connection of the heat exchanger 30 with the chiller 22 forms a closed heat circuit by means of the air conditioning circuit 16. In borderline cases, that is, if no heat is dissipated from the condenser 34 to the vehicle interior of the electric vehicle, the heat exchanger 30 transfers the same amount of heat to the coolant as the chiller 22 previously extracted from this coolant. To maintain this heat circuit, the compressor 38 must perform hydraulic work. This work and the associated heat loss of the compressor 38 increases the larger the amount of circulating heat becomes. The heat loss of the compressor 38 is dissipated via the refrigerant and consequently additionally increases the heat transfer to the coolant. Accordingly, in this operating mode, the heat loss of the compressor 38 adds to the heat output of the PTC heater 20, so that a particularly high heating power is available for rapid heating of the drive battery 6 and/or the vehicle interior of the electric vehicle.

As can be clearly seen from the above embodiments, depending on an actuation of the coolant valve 18 and an actuation of the heat exchange device 24 by means of the control unit 4, a heat transfer connection between the battery circuit 8 and/or the drive circuit 14 on the one hand and the air conditioning circuit 16 on the other hand is established or separated by means of the at least one heat exchange device 24. Furthermore, by means of an actuation of the coolant valve 18 simultaneously formed as a further coolant valve by means of the control unit 4, the heat transfer circuit 44 is connected or separated for transfer of coolant to the battery circuit 8 and/or the drive circuit 14. Depending on an actuation of the refrigerant valves 26, 28 simultaneously formed as bypass valves, it is also possible to flow refrigerant through the heat exchanger 30 arranged in the air conditioning circuit 16 or not. The same applies to the chiller 22 and the valve 40 assigned to it. The actuation of the coolant valve 18 and/or the heat exchange device 24 and/or the refrigerant valves 26, 28 and/or the coolant pumps 13, 23, 46 actuatable by means of the control 4 in one of said coolant circuits 8, 14, 44 for conveying the coolant in this coolant circuit 8, 14, 44 is carried out depending on the vehicle state of the electric vehicle and/or the driving state of the electric vehicle and/or at least one ambient condition of the free environment.

Figure 4:
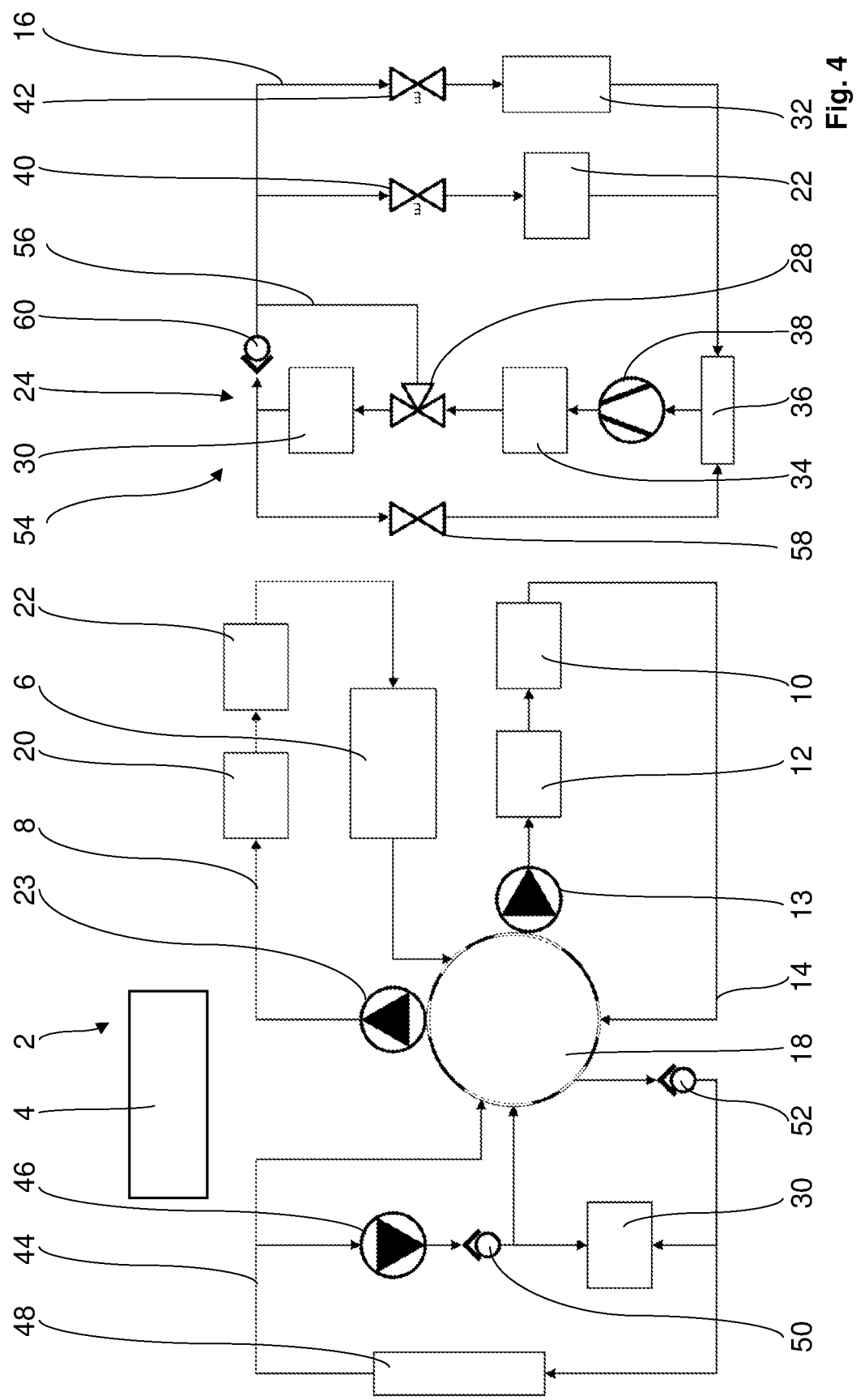
FIG. 4 shows an example of the thermal management system according to the invention for an electric vehicle, in a block diagram.

FIGS. 4 and 5 show two embodiments of the thermal management system according to the invention as an alternative to the first embodiment according to FIGS. 1 to 3 by way of example. Of course, other design, manufacturing and circuitry changes are also conceivable.

In the second embodiment of the thermal management system according to the invention according to FIG. 4, the heat exchange device 24, formed of the heat exchanger 30 and the refrigerant valves 26, 28, is modified as compared to the first embodiment according to FIGS. 1 to 3. Instead of two 3/2-way valves, one of the 3/2-way valves, namely the refrigerant valve 26, has been replaced by a one-way valve 58 and a check valve 60. Otherwise, the second embodiment corresponds to the first embodiment. Accordingly, reference is made here in this regard to the above remarks on the first embodiment.

The third embodiment according to FIG. 5 is an embodiment of the thermal management system according to the invention in which the range of functions and thus the complexity of the thermal management system is reduced as compared to the first two embodiments. The advantage of this third embodiment is in particular that the coolant valve can be simplified and thus be more cost-effective. The air conditioning circuit 16 corresponds here to the first embodiment, but here the heat transfer circuit 44 is modified as compared to the first and second embodiments.

Due to the inventive embodiment of the thermal management system for an electric vehicle and the method for its operation according to the present embodiments, an efficient temperature control of the electric vehicle, namely of the drive battery 6, the electric drive 10 and the power electronics 12 for the electric drive 10 and of the vehicle interior of the electric vehicle, with simultaneous simplified design of the thermal management system 2, is possible. Accordingly, for example, an air-refrigerant condenser in the front end of the electric vehicle is dispensable. Furthermore, the thermal management system 2 can be realized with less design and manufacturing effort and at lower cost. The system architecture according to the invention as a whole is significantly simplified as compared to conventional technical solutions.

The invention is not limited to the present embodiments. For example, the invention is also advantageously applicable to other electric vehicles. See also the explanations in the description introduction.

In particular, the invention is not limited to the design, manufacturing and circuitry design of the three embodiments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermal management system for an electric vehicle, the system comprising:
   a control unit;
   a battery circuit connected for heat transfer to a drive battery of the electric vehicle;
   a drive circuit connected for heat transfer to an electric drive of the electric vehicle and/or to a power electronics for the electric drive; and
   an air conditioning circuit connected for heat transfer to a vehicle interior of the electric vehicle,
   wherein the battery circuit and the drive circuit are each operable with a coolant and connected to or separated from one another for transfer of coolant via at least one actuatable coolant valve, and the air conditioning circuit is operated with a refrigerant different from the coolant, and
   wherein a heat transfer connection between the battery circuit and/or the drive circuit and the air conditioning circuit is established or separated via at least one heat exchange device of the thermal management system depending on an actuation of the at least one actuatable coolant valve and an actuation of the at least one heat exchange device via the control unit, wherein the at least one heat exchange device comprises at least one refrigerant valve and at least one heat exchanger, wherein the at least one heat exchanger is adapted to be flowed through by refrigerant or not depending on an actuation of the at least one refrigerant valve by the control unit, wherein the thermal management system additionally comprises a heat transfer circuit operable with the coolant, wherein the at least one heat exchanger is arranged in the heat transfer circuit such that via the at least one heat exchanger, a heat transfer connection is established or separated between the coolant flowing in the heat transfer circuit and the refrigerant, wherein in a first switching position of the at least one refrigerant valve, the at least one heat exchanger is a heat source for the heat transfer circuit, such that heat is transferred from the air conditioning circuit to the heat transfer circuit, and wherein in a second switching position of the at least one refrigerant valve, the at least one heat exchanger transfers heat from the heat transfer circuit to the air conditioning circuit.

2. The thermal management system according to claim 1, wherein the heat transfer circuit is adapted to be connected to or separated from the battery circuit and/or the drive circuit for transfer of coolant via at least one further coolant valve actuatable by the control unit, wherein the at least one actuatable coolant valve is simultaneously formed as the at least one further coolant valve.

3. The thermal management system according to claim 2, wherein the heat transfer circuit is designed such that via the heat transfer circuit, a heat transfer connection between the coolant flowing in the heat transfer circuit and the free environment is established or separated, wherein the heat transfer to the free environment is made possible by a second heat exchanger arranged in the heat transfer circuit.

4. The thermal management system according to claim 1, wherein the heat transfer circuit is adapted to be connected to or separated from the battery circuit and/or the drive circuit for transfer of coolant via the at least one actuatable coolant valve that is actuatable by the control unit, and wherein the at least one actuatable coolant valve includes a first coolant valve, and wherein the heat transfer circuit, the battery circuit and the drive circuit are all directly connected to the first coolant valve, such that the first coolant valve connects or separates the heat transfer circuit, the battery circuit and the drive circuit from one another.

5. The thermal management system according to claim 2, wherein the at least one heat exchange device and/or the at least one actuatable coolant valve are designed coordinated in such a way that the battery circuit and/or the drive circuit and the air conditioning circuit and/or the heat transfer circuit are heatable and/or coolable via the at least one heat exchange device, and/or that the air conditioning circuit and the battery circuit and/or the drive circuit and/or the heat transfer circuit are heatable and/or coolable via the at least one heat exchange device.

6. The thermal management system according to claim 2, wherein the thermal management system comprises at least one bypass device having at least one bypass line and at least one actuatable bypass valve, wherein via the at least one bypass device, the at least one heat exchanger is flowed through or not depending on an actuation of the at least one actuatable bypass valve via the control unit, wherein the at least one actuatable bypass valve is distinct from the at least one actuatable coolant valve.

7. The thermal management system according to claim 6, wherein the at least one bypass device is provided in the battery circuit and/or the drive circuit and/or the air conditioning circuit and/or the heat transfer circuit, and wherein the at least one heat exchanger is arranged in the battery circuit and/or the drive circuit and/or the air conditioning circuit and/or the heat transfer circuit having the at least one bypass device.

8. The thermal management system according to claim 6, wherein the at least one bypass device and the at least one heat exchanger are provided in the air conditioning circuit, and wherein the at least one refrigerant valve forms the at least one actuatable bypass valve.

9. A method for operating the thermal management system according to claim 6 for an electric vehicle, the method comprising:

depending on an actuation of the at least one actuatable coolant valve and an actuation of the at least one heat exchange device by the control unit, a heat transfer connection between the battery circuit and/or the drive circuit and the air conditioning circuit is established or separated by the at least one heat exchange device.

10. The method according to claim 9, wherein by an actuation of the at least one actuatable coolant valve by the control unit, the heat transfer circuit is connected to or separated from the battery circuit and/or the drive circuit for transfer of coolant.

11. The method according to claim 9, wherein, depending on an actuation of the at least one actuatable bypass valve, the at least one heat exchanger is flowed through or not.

12. The method according to claim 9, wherein the actuation of the at least one actuatable coolant valve and/or the at least one heat exchange device and/or the at least one actuatable bypass valve and/or a pump actuatable by the control unit takes place in any of the battery circuit, the drive circuit or the heat transfer circuit to convey the coolant in the battery circuit, the drive circuit or the heat transfer circuit depending on a vehicle state of the electric vehicle and/or a driving state of the electric vehicle and/or at least one ambient condition of the free environment.

* * * * *